(12) United States Patent
Chen

(10) Patent No.: US 9,981,540 B2
(45) Date of Patent: May 29, 2018

(54) SHIELDING DEVICE

(71) Applicant: SPORTSMAN CORPORATION, New Taipei (TW)

(72) Inventor: Jack Chen, New Taipei (TW)

(73) Assignee: SPORTSMAN CORPORATION, New Taipei (TW)

( * ) Notice: Subject to any disclaimer, the term of this patent is extended or adjusted under 35 U.S.C. 154(b) by 183 days.

(21) Appl. No.: 14/808,019

(22) Filed: Jul. 24, 2015

(65) Prior Publication Data

US 2016/0075222 A1 Mar. 17, 2016

(30) Foreign Application Priority Data

Sep. 15, 2014 (TW) .............................. 103131822 A

(51) Int. Cl.
*B60J 11/04* (2006.01)
*B60J 11/02* (2006.01)

(52) U.S. Cl.
CPC ................ *B60J 11/04* (2013.01); *B60J 11/02* (2013.01)

(58) Field of Classification Search
CPC .. B60J 11/04; B60J 11/02; B60J 11/00; E06B 9/56; E06B 9/60; E06B 9/80; E06B 2009/802
USPC ................... 160/304.1, 318, 313, 326, 323.1
See application file for complete search history.

(56) References Cited

U.S. PATENT DOCUMENTS

| 2,589,609 A | * | 3/1952 | Foster | ....................... G09F 7/00 160/23.1 |
| 2,696,249 A | * | 12/1954 | Prokop | ................... G03B 21/58 160/24 |
| 2,822,040 A | * | 2/1958 | Petrick | ................... G03B 21/58 160/24 |

(Continued)

FOREIGN PATENT DOCUMENTS

| CN | 2082695 U | 8/1991 |
| CN | 201109364 Y | 9/2008 |

(Continued)

OTHER PUBLICATIONS

Patent Examination Report No. 1 for Australian Patent Application No. 2015207958, dated Nov. 27, 2015, 6 pages.

(Continued)

*Primary Examiner* — Blair M Johnson
(74) *Attorney, Agent, or Firm* — Withrow & Terranova, P.L.L.C.; Vincent K. Gustafson

(57) ABSTRACT

A shielding device has a body, at least one slewing mechanism and two vehicle-top suction attachment assemblies. The body has a housing, a first cover and a second cover. The first cover and the second cover are mounted in the housing. The slewing mechanism has a spindle, a rotor, a rolling pipe, a rotating casing and a covering cloth. The spindle is mounted in the second cover. The rotor is mounted on and around the spindle and has a fastening portion, a torsion spring and a securing ring. The torsion spring is connected to the fastening portion. The securing ring is securely mounted on and around the spindle. The fastening portion is fastened in the rolling pipe. The rotating casing is mounted pivotally in the first cover. The covering cloth is mounted on the rolling pipe. The vehicle-top suction attachment assemblies are mounted on the body.

16 Claims, 13 Drawing Sheets

(56) References Cited

U.S. PATENT DOCUMENTS

| | | | |
|---|---|---|---|
| 4,250,952 A * | 2/1981 | Scheinecker | B22D 11/1281 164/448 |
| 5,036,898 A | 8/1991 | Chen | |
| 5,054,533 A | 10/1991 | Lii | |
| 5,205,332 A | 4/1993 | Lii | |
| 6,059,010 A | 5/2000 | Yang | |
| 6,908,138 B2 | 6/2005 | Yang | |
| 7,185,694 B2 | 3/2007 | Dunn et al. | |
| 8,684,444 B2 * | 4/2014 | Dao | B60J 11/02 296/136.01 |
| 2008/0135145 A1 * | 6/2008 | Hsieh | B60J 11/02 150/166 |
| 2011/0088855 A1 * | 4/2011 | Boustani | B60J 11/02 160/370.22 |
| 2013/0214472 A1 * | 8/2013 | Suzuki | B65H 39/00 270/1.01 |
| 2016/0075222 A1 * | 3/2016 | Chen | B60J 11/04 160/239 |
| 2016/0311298 A1 * | 10/2016 | Tokhy | B60J 11/02 |
| 2017/0129320 A1 * | 5/2017 | Tran | B60J 11/04 |
| 2017/0217295 A1 * | 8/2017 | Tran | B60J 11/04 |

FOREIGN PATENT DOCUMENTS

| | | |
|---|---|---|
| CN | 202038150 U | 11/2011 |
| CN | 202753740 U | 2/2013 |
| JP | S5591714 U | 6/1980 |
| JP | S55110525 A | 8/1980 |
| JP | S63155824 U | 10/1988 |
| JP | 3026631 U | 7/1996 |
| JP | 2001030752 A | 2/2001 |
| JP | 2001260664 A | 9/2001 |
| JP | 2005059746 A | 3/2005 |
| TW | 277442 | 6/1996 |
| TW | M331455 U | 5/2008 |

OTHER PUBLICATIONS

Extended European Search Report for European Patent Application No. 15180509.0, dated Feb. 10, 2016, 8 pages.
Substantial Examination Report for Saudi Arabian Patent Application No. 115360742, dated Sep. 4, 2016, 4 pages.

* cited by examiner

SHIELDING DEVICE

PRIORITY CLAIM

The present application claims priority under 35 U.S.C. 119(a) to Taiwan Application No. 103131822 filed on Sep. 15, 2014, and entitled "SHIELDING DEVICE," which is incorporated herein by reference in its entirety.

BACKGROUND OF THE INVENTION

1. Field of the Invention

The present disclosure relates to a shielding device, especially a shielding device that can be mounted on a vehicle to shield the sun, to avoid rain beating or the accumulation of snow.

2. Description of the Prior Arts

Vehicle is a common means of transportation in the contemporary society, especially the four-door vehicle or sport utility vehicle. For people living in either an urban district or a suburban district, finding a parking space for their vehicles is always necessary. Due to lack of indoor parking pools, most vehicles are usually parked in outdoor parking pools. However, the outdoor parking pools do not have any shelter to cover the vehicles, so the vehicles are damaged directly by sunlight, wind, rain, and even snow in some cold countries. In the above-mentioned conditions, the shells of the vehicles might be damaged. Therefore, a conventional vehicle-covering shed has been developed, and the conventional vehicle-covering shed is a foldable device. The conventional vehicle-covering shed is unfolded for mounting on the ground to cover and protect the vehicles. However, the conventional vehicle-covering shed has a large volume when unfolded, easily obstructs the traffic, and affects the appearance of the city. Though foldable, the conventional vehicle-covering shed still has a large volume in a folded condition and is difficult to store.

To overcome the shortcomings, the present disclosure provides a shielding device to mitigate or obviate the aforementioned problems.

SUMMARY OF THE DISCLOSURE

The main objective of the present disclosure is to provide a shielding device that can be stored with a small volume and can cover a vehicle without obstructing the traffic.

The shielding device comprises a body, at least one slewing mechanism, and two vehicle-top suction attachment assemblies.

The body has a housing, a first cover, a second cover, and a pushing rod. The housing has a space, and the space is formed through two ends and a side wall of the housing. The first cover is mounted through one of the two ends of the housing and is partially located in the space. The second cover is mounted through the other end of the housing and is partially located in the space, and the second cover has a limiting hole and a positioning hole. The limiting hole is formed through a center of the second cover, and the positioning hole is formed through the second cover near the limiting hole. The pushing rod is slidably mounted through the positioning hole.

The at least one slewing mechanism is mounted in the body and has a spindle, a rotor, a rolling pipe, a rotating casing, and a covering cloth. The spindle has two ends, and one of the two ends of the spindle is mounted in the limiting hole of the second cover. The rotor is mounted on and around the spindle and is pushed by the pushing rod. The rotor has a fastening portion, a torsion spring, a securing ring, and a rotating ring. The fastening portion extends on the rotor. The torsion spring has two ends, and one of the two ends of the torsion spring is connected to the fastening portion. The securing ring is securely mounted on and around the spindle and is distal from the fastening portion, and the securing ring is connected to the other end of the torsion spring. The rotating ring is rotatably mounted on and around the spindle and is located at an outer side relative to the securing ring. The rolling pipe has a through hole and two ends, and the through hole is formed through the two ends of the rolling pipe. The fastening portion of the rotor is fastened in the through hole of the rolling pipe. The spindle, the torsion spring, the securing ring, and the rotating ring are mounted in the rolling pipe. The rotating casing is fastened in the through hole and is distal from the fastening portion. The rotating casing is mounted pivotally in the first cover. The covering cloth is mounted on an outer surface of the rolling pipe.

The vehicle-top suction attachment assemblies are mounted on a bottom surface of the body and respectively near the first cover and the second cover.

Other objectives, advantages and novel features of the disclosure will become more apparent from the following detailed description when taken in conjunction with the accompanying drawings.

DETAILED DESCRIPTION OF THE PREFERRED EMBODIMENTS

Figure 1:
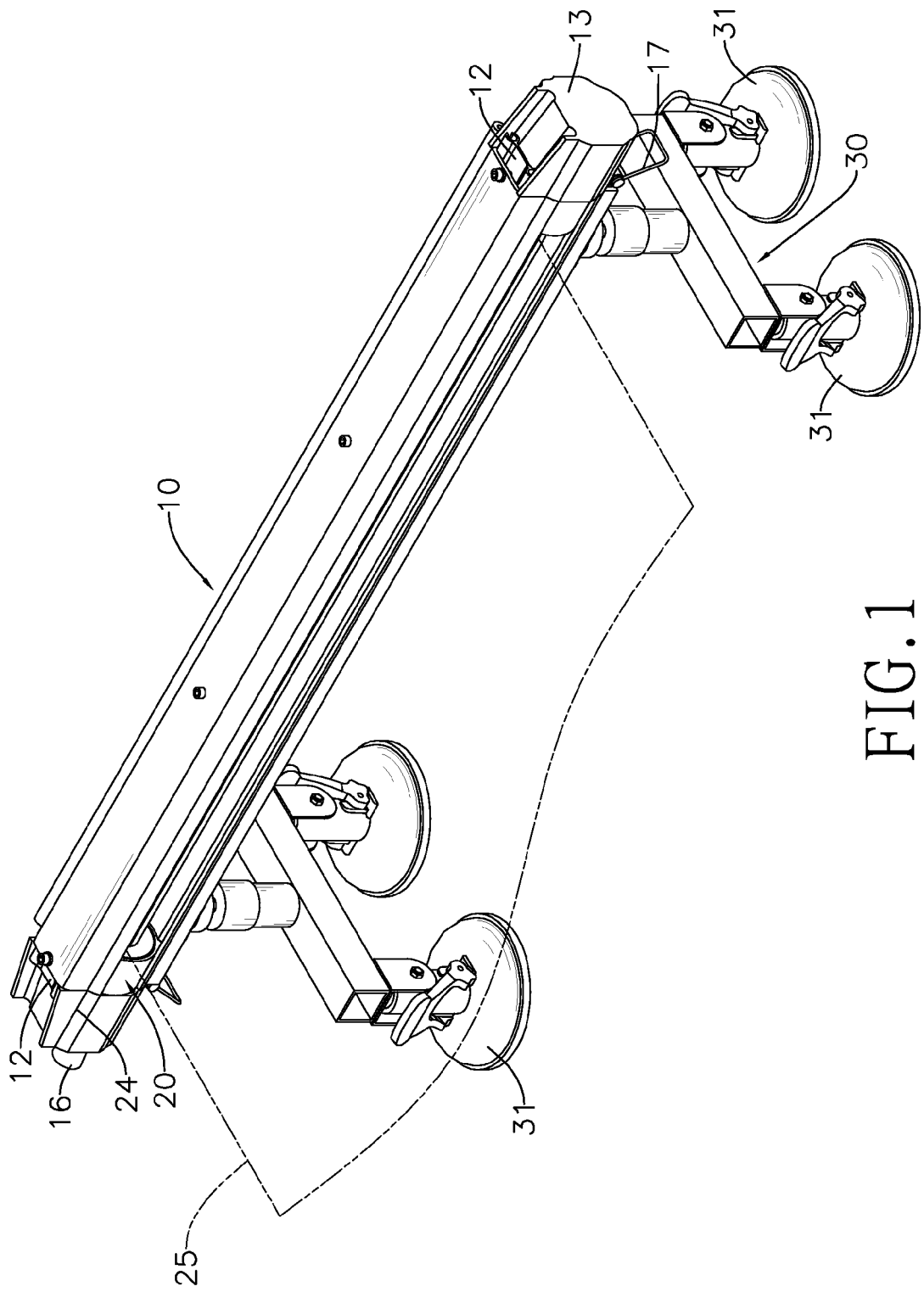
FIG. 1 is a perspective view of a first embodiment of a shielding device in accordance with the present disclosure.
Figure 2:
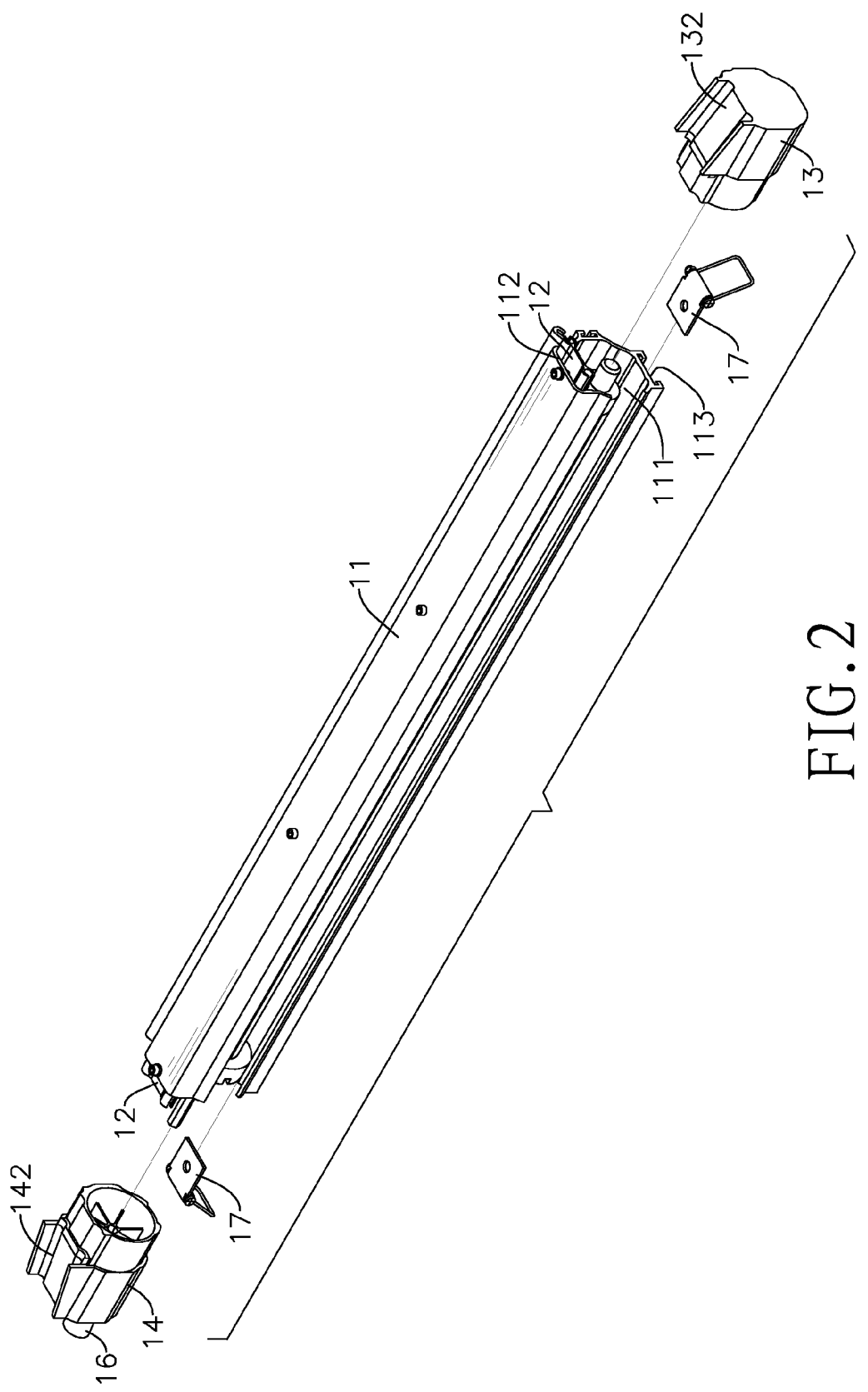
FIG. 2 is an exploded perspective view of the shielding device in FIG. 1.
Figure 3:
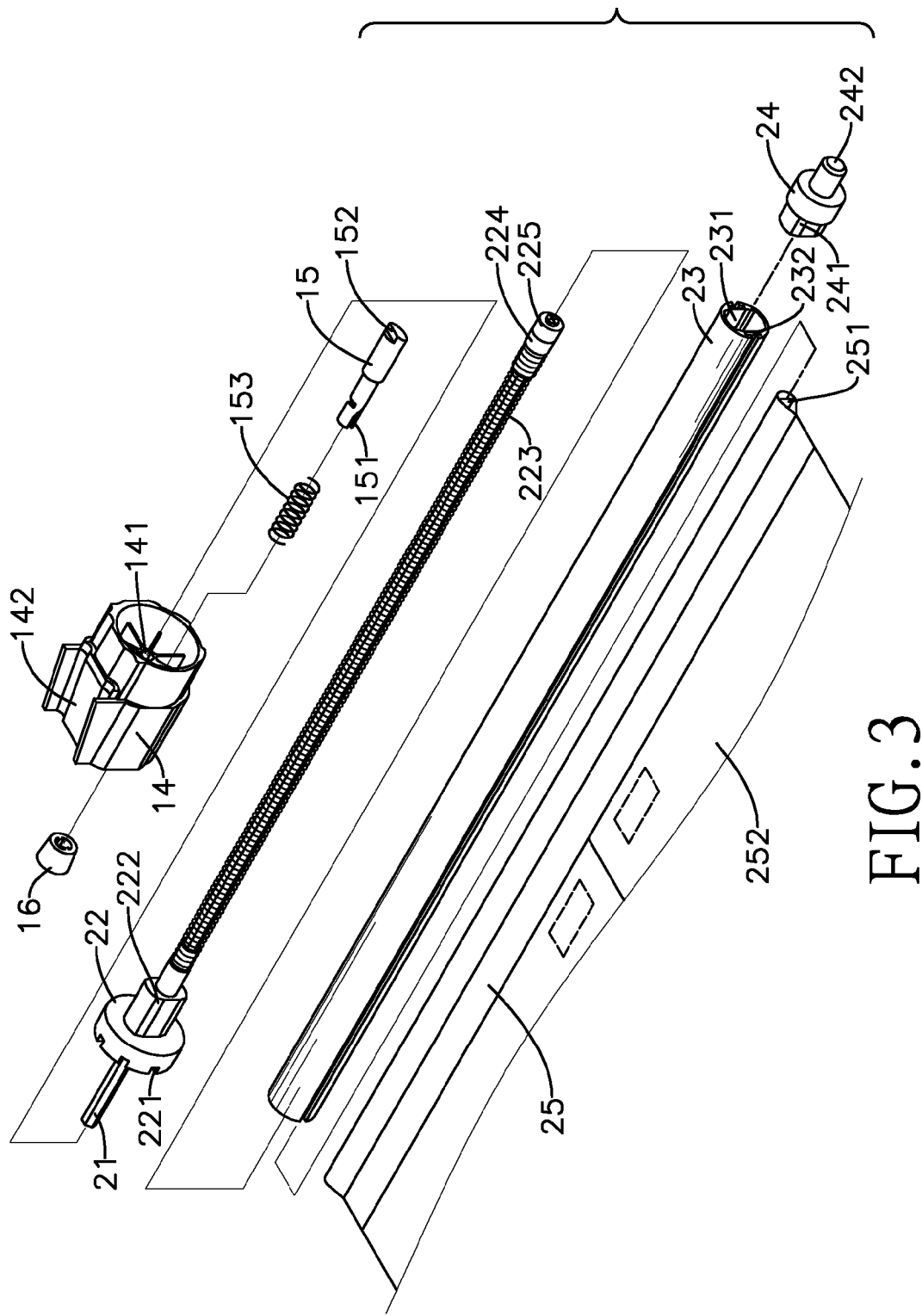
FIG. 3 is an exploded perspective view of a slewing mechanism of the shielding device in FIG. 1.

With reference to FIGS. 1 to 3, a first embodiment of a shielding device in accordance with the present disclosure comprises a body 10, a slewing mechanism 20, and two vehicle-top suction attachment assemblies 30.

With reference to FIGS. 2 to 5, the body 10 has a bottom surface, a housing 11, two unfolding sheets 12, a first cover 13, a second cover 14, a pushing rod 15, a pulling ring 16, two belt-hooking sheets 17, and two restricting belts 18. The housing 11 has two ends, a side wall, an inner top surface, a space 111, a receiving recess 112, and an elongated groove 113. The space 111 is formed through the two ends and the side wall of the housing 11. The receiving recess 112 is formed in the space 111, is disposed near the inner top surface of the housing 11, and has two openings. The elongated groove 113 is caved on the bottom surface of the body 10 and is parallel to the space 111.

Figure 5:
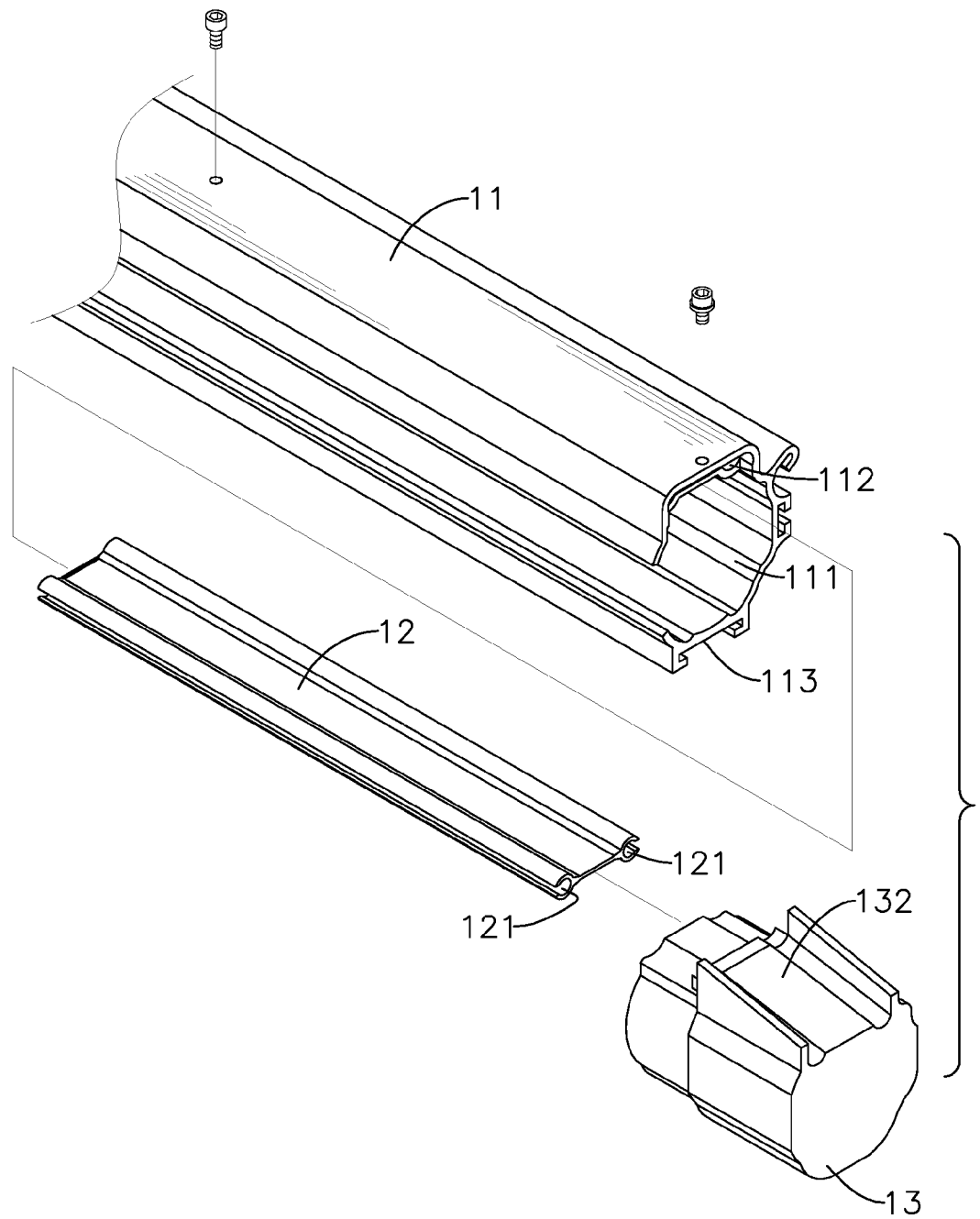
FIG. 5 is an enlarged exploded view of a body of the shielding device in FIG. 1.
Figure 6:
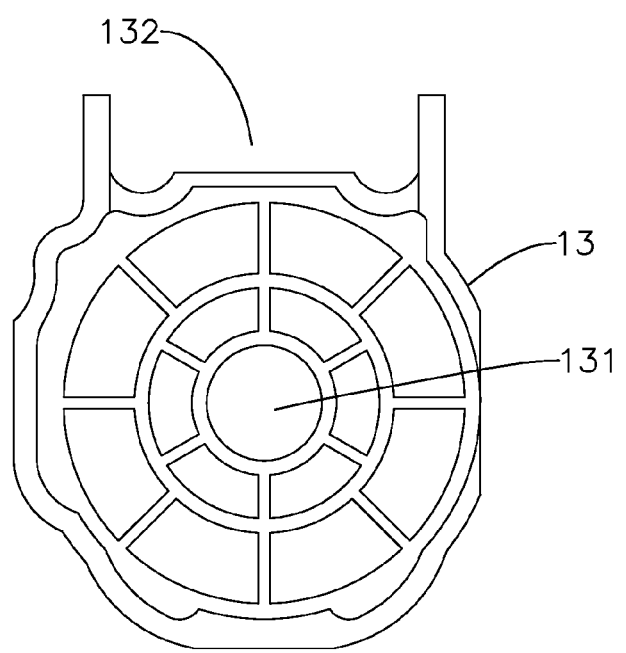
FIG. 6 is a side view of a first cover of the shielding device in FIG. 1.
Figure 7:
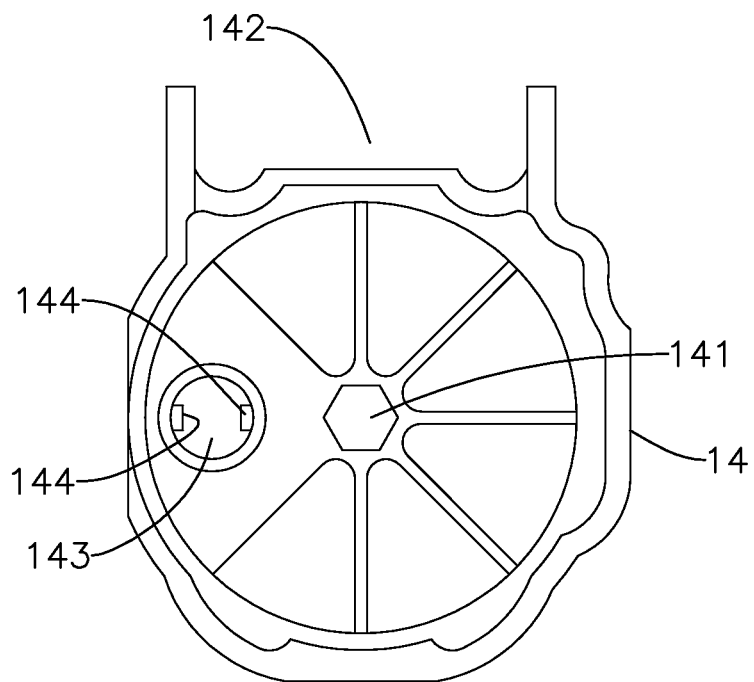
FIG. 7 is a side view of a second cover of the shielding device in FIG. 1.

With reference to FIGS. 2 and 5, the two unfolding sheets 12 are respectively mounted in and extend out of the openings of the receiving recess 112, and each unfolding sheet 12 has two long edges and two fastening grooves 121. The two fastening grooves 121 are respectively formed on the two long edges of the unfolding sheet 12, and each fastening groove 121 has two holes outwardly formed on the unfolding sheet 12. With reference to FIGS. 5 to 7, the first cover 13 is mounted in and extends out of one of the two ends of the housing 11 and is partially located in the space 111 of the housing 11. The first cover 13 has an inner surface, a top surface, an inner side, an outer side, a rotating hole 131 and a first slanting groove 132. The inner side of the first cover 13 is mounted in the housing 11. The outer side of the first cover 13 extends out of the housing 11. The rotating hole 131 is centrally caved and formed on the inner surface of the first cover 13. The first slanting groove 132 is obliquely formed on the top surface of the first cover 13 and gradually inclined from the inner side of the first cover 13 to the outer side of the first cover 13.

Figure 4:
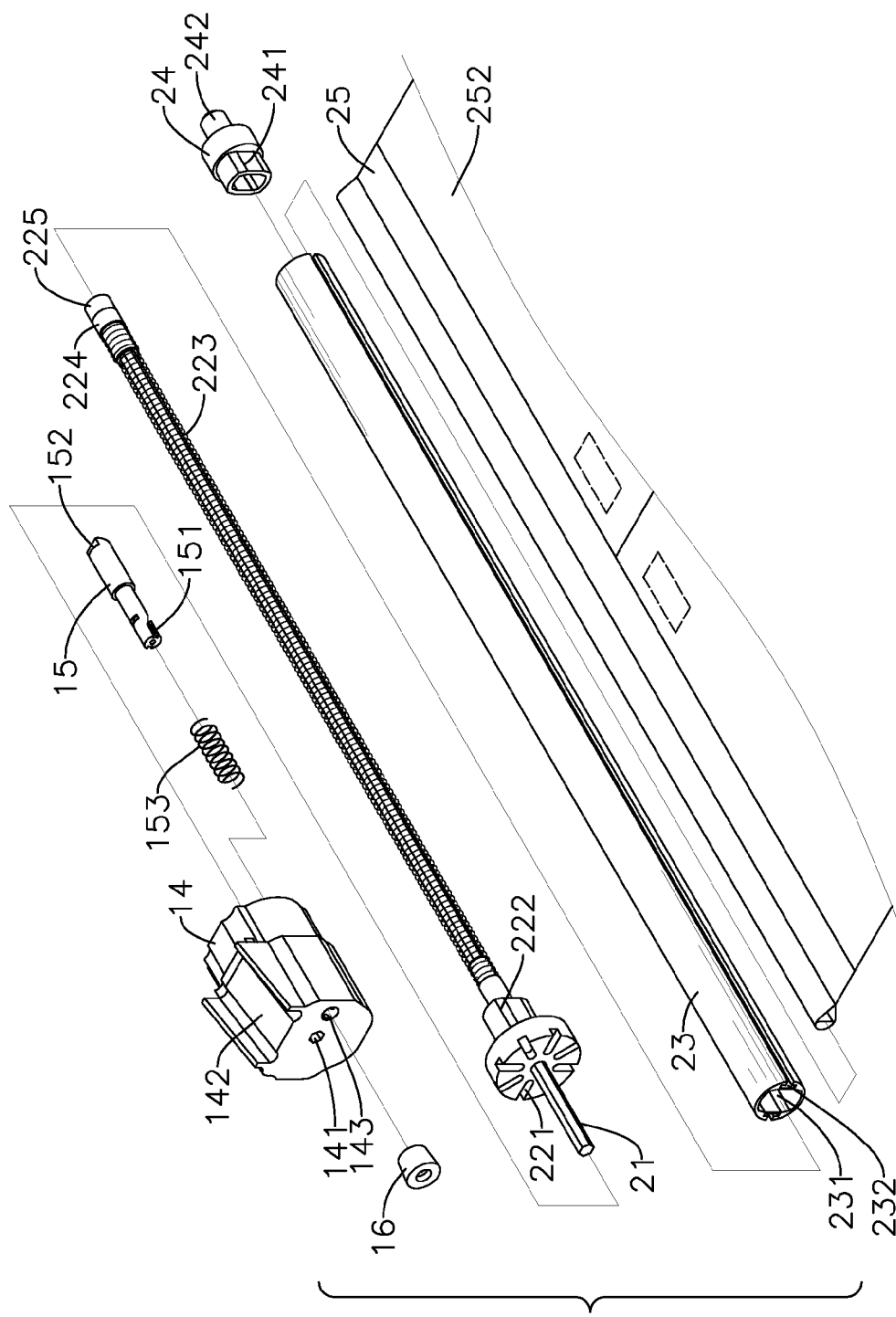
FIG. 4 is another exploded perspective view of the slewing mechanism of the shielding device in FIG. 1.

With reference to FIGS. 2, 4, and 7, the second cover 14 is mounted in and extends out of the other end of the housing 11 and is located partially in the space 111. The second cover 14 has a top surface, an inner side, an outer side, a limiting hole 141, a second slanting groove 142, a positioning hole 143, and two positioning blocks 144. The inner side of the second cover 14 is mounted in the housing 11. The outer side of the second cover 14 extends out of the housing 11. The limiting hole 141 is formed through a center of the second cover 14 and aligns with the rotating hole 131 of the first cover 13. The limiting hole 141 is a hexagonal hole. The second slanting groove 142 is formed on the top surface of the second cover 14 and gradually inclined from the inner side of the second cover 14 to the outer side of the second cover 14. The positioning hole 143 is formed through the second cover 14 near the limiting hole 141 and has an inner wall. The positioning blocks 144 are formed on the inner wall of the positioning hole 143 and are opposite to each other.

Figure 8:
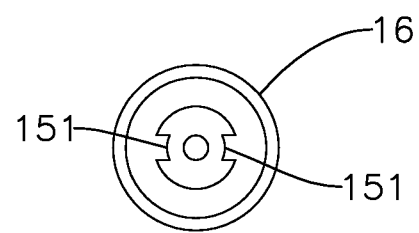
FIG. 8 is an enlarged side view of a pulling ring of the shielding device in FIG. 1.

With reference to FIGS. 3, 4, and 8, the pushing rod 15 is slidably mounted through the positioning hole 143 of the second cover 14 and has an outer wall, a first end, a second end, two positioning grooves 151, a limiting portion 152, and a compression spring 153. The positioning grooves 151 are caved on the outer wall of the pushing rod 15 at the first end of the pushing rod 15 and parallel to each other. The positioning grooves 151 are respectively disposed around the positioning blocks 144 of the second cover 14. The limiting portion 152 is formed on and extends from the second end of the pushing rod 15 and is distal from the positioning grooves 151. A diameter of the second end of the pushing rod 15 is larger than a diameter of the first end of the pushing rod 15. The compression spring 153 is mounted around the outer wall of the pushing rod 15 at the first end of the pushing rod 15 and pushes the positioning blocks 144 of the second cover 14. The first end of the pushing rod 15 is mounted through the positioning hole 143 of the second cover 14 and securely connects to the pulling ring 16.

Figure 12:
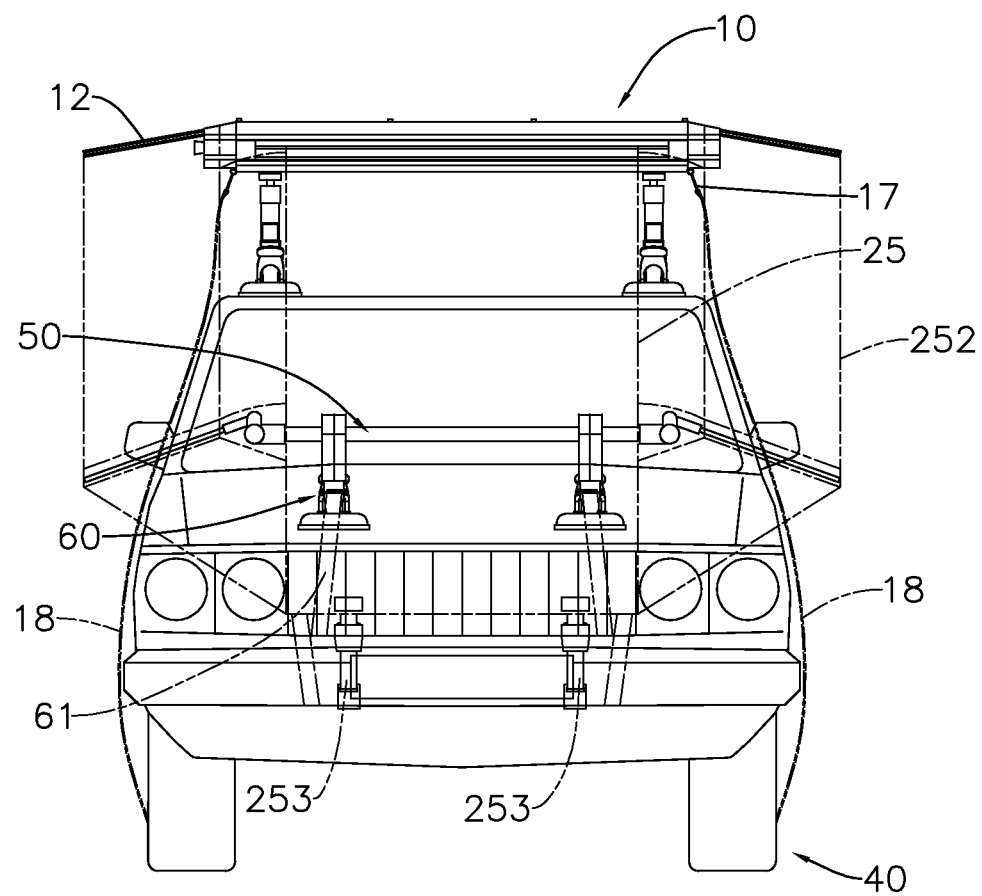
FIG. 12 is an operational front view of a fixing strip in FIG. 11.

With reference to FIGS. 2 and 12, the belt-hooking sheets 17 are mounted securely in the elongated groove 113 of the housing 11 and are respectively disposed below the first cover 13 and the second cover 14. The restricting belts 18 are respectively connected to the belt-hooking sheets 17.

With reference to FIGS. 3 to 6, the slewing mechanism 20 is mounted in the body 10 and has a spindle 21, a rotor 22, a rolling pipe 23, a rotating casing 24, and a covering cloth 25. The spindle 21 is a hexagonal rod and is mounted in the body 11. The spindle 21 has two ends, and one of the two ends of the spindle 21 is mounted in the limiting hole 141 of the second cover 14. The other end of the spindle 21 is distal from the second cover 14. The rotor 22 is mounted on and around the spindle 21 and has an outer wall, an inner side, multiple limiting grooves 221, a fastening portion 222, a torsion spring 223, a securing ring 224, and a rotating ring 225. The limiting grooves 221 are concaved round the outer wall of the rotor 22, are spaced apart from each other at intervals, and face the second cover 14. The limiting portion 152 of the pushing rod 15 is fastened in one of the limiting grooves 221. The fastening portion 222 is formed on and protrudes from the inner side of the rotor 22 and faces the first cover 13. The torsion spring 223 has two ends, and one of the two ends of the torsion spring 223 is connected to the fastening portion 222. The securing ring 224 is mounted securely on and around the spindle 21 and is distal from the fastening portion 222, and the securing ring 224 is connected to the other end of the torsion spring 223. The rotating ring 225 is rotatably mounted on and around the spindle 21 and is located at an outer side relative to the securing ring 224.

The rolling pipe 23 is sleeved around the spindle 21 and connects to the rotor 22. The rolling pipe 23 has two ends, an external wall, a through hole 231, and at least one connecting groove 232. The through hole 231 is formed through the two ends of the rolling pipe 23. The fastening portion 222 of the rotor 22 is fastened in the through hole 231 of the rolling pipe 23 and faces the second cover 14 to enclose the spindle 21, the torsion spring 223, the securing ring 224, and the rotating ring 225 in the rolling pipe 23. The at least one connecting groove 232 is caved on the rolling pipe 23. Preferably, the rolling pipe 23 has two connecting grooves 232. The connecting grooves 232 are respectively caved on the external wall of the rolling pipe 23 and are parallel to each other.

The rotating casing 24 is connected to the rolling pipe 23 and has an internal wall, an external wall, a fixing portion 241 and a pivoting portion 242. The fixing portion 241 extends on the internal wall of the rotating casing 24 and is a hollow structure. The securing ring 224 of the rotor 22 is mounted around the other end of the spindle 21. The securing ring 224 and the rotating ring 225 of the rotor 22 are mounted in the fixing portion 241 of the rotating casing 24. The fixing portion 241 is fastened in the through hole 231 and is opposite to the fastening portion 222. The pivoting portion 242 extends on the external wall of the rotating casing 24 and is mounted pivotally in the rotating hole 131 of the first cover 13.

Figure 9:
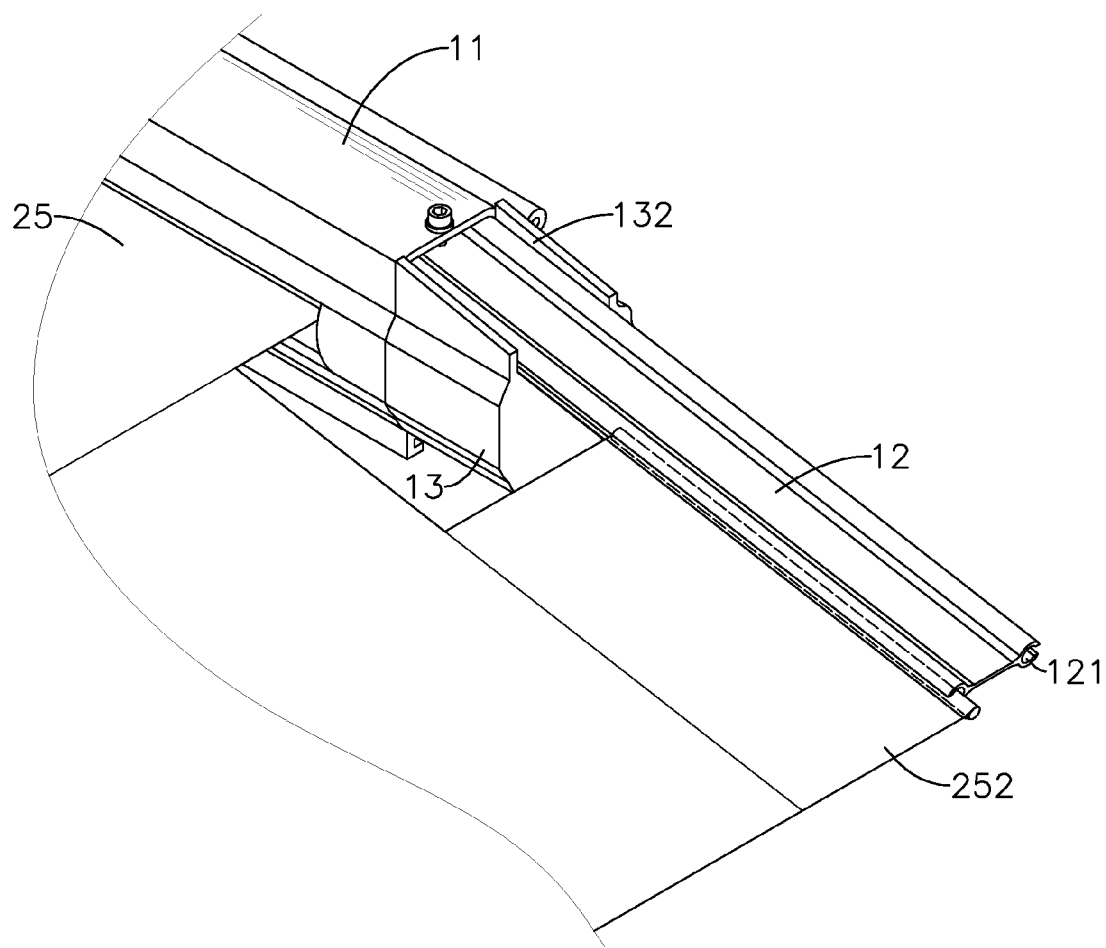
FIG. 9 is an operational perspective view of a covering cloth of the shielding device in FIG. 1.
Figure 11:
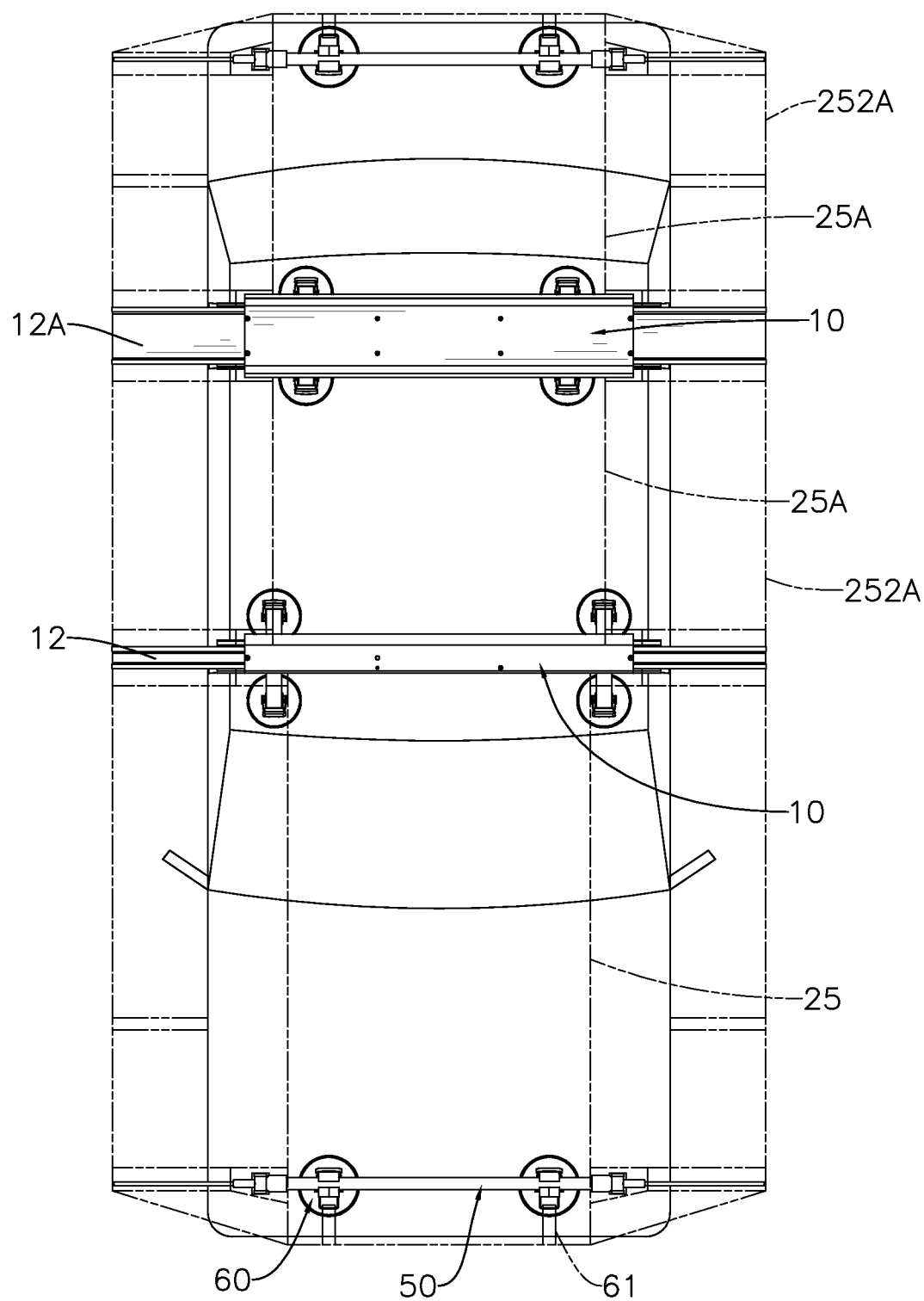
FIG. 11 is an operational top view showing the first embodiment and the second embodiment combined for use.
Figure 13:
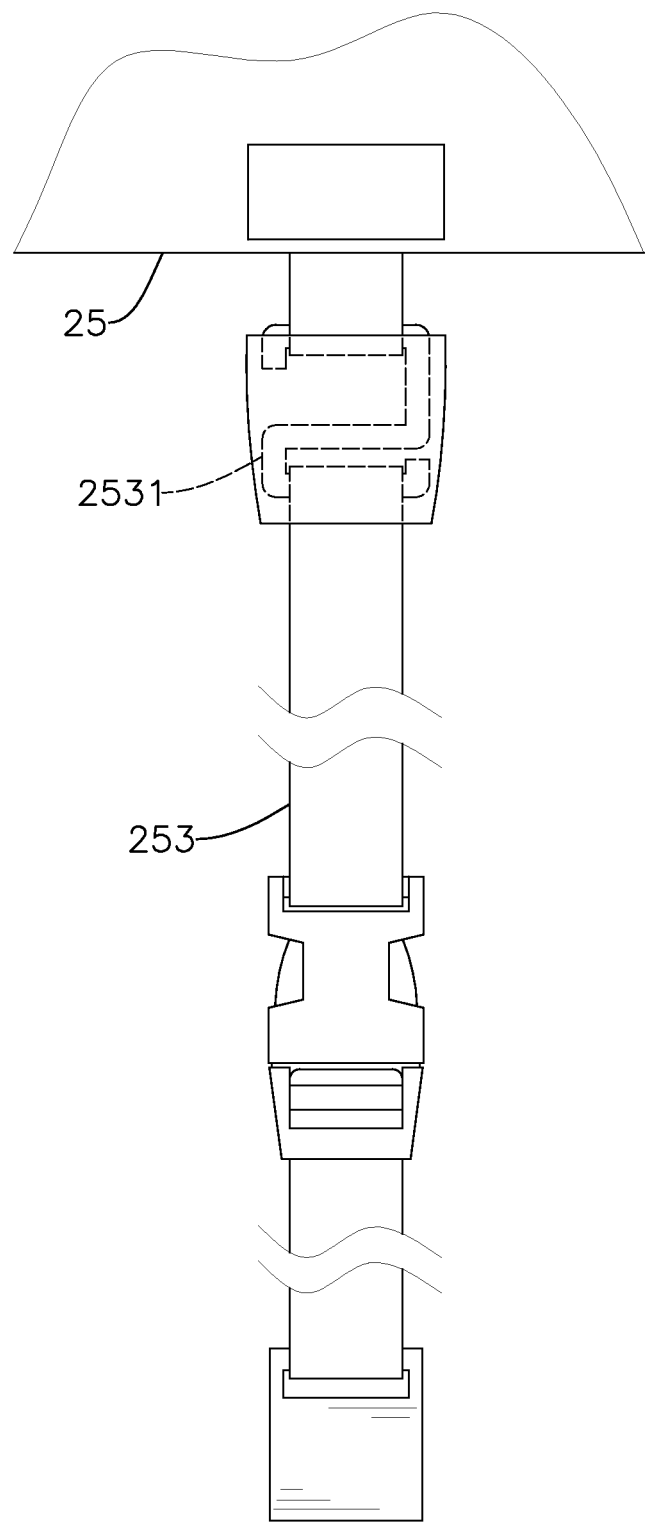
FIG. 13 is an enlarged and operational front view of the fixing strip in FIG. 12.

With reference to FIGS. 1, 3, and 9, the covering cloth 25 is connected to the external wall of the rolling pipe 23. The covering cloth 25 has a front edge, a connecting portion 251, two stretching sections 252, and two fixing strips 253. The connecting portion 251 is mounted on an edge of the covering cloth 25 and is positioned in the at least one connecting groove 232. The stretching sections 252 are respectively formed on two sides of the covering cloth 25 and are foldable relative to the covering cloth 25. The two stretching sections 252 are respectively positioned in the two fastening grooves 121 of the unfolding sheets 12 when the stretching sections 252 are spread. With reference to FIGS. 11 to 13, the fixing strips 253 are connected to the front edge of the covering cloth 25 between the stretching sections 252. Each fixing strip 253 has a hook 2531. Each hook 2531 has two hook parts. The covering cloth 25 and the fixing strip 253 are connected to each other by the hook parts of the hooks 2531.

With reference to FIG. 1, the vehicle-top suction attachment assemblies 30 are securely mounted in the elongated groove 113 of the body 11 and respectively near the two belt-hooking sheets 17. Each vehicle-top suction attachment assembly 30 has a bottom surface and two first sucking discs 31. The first sucking discs 31 are mounted on the bottom surface of the vehicle-top suction attachment assembly 30 and spaced apart at an interval.

Figure 10:
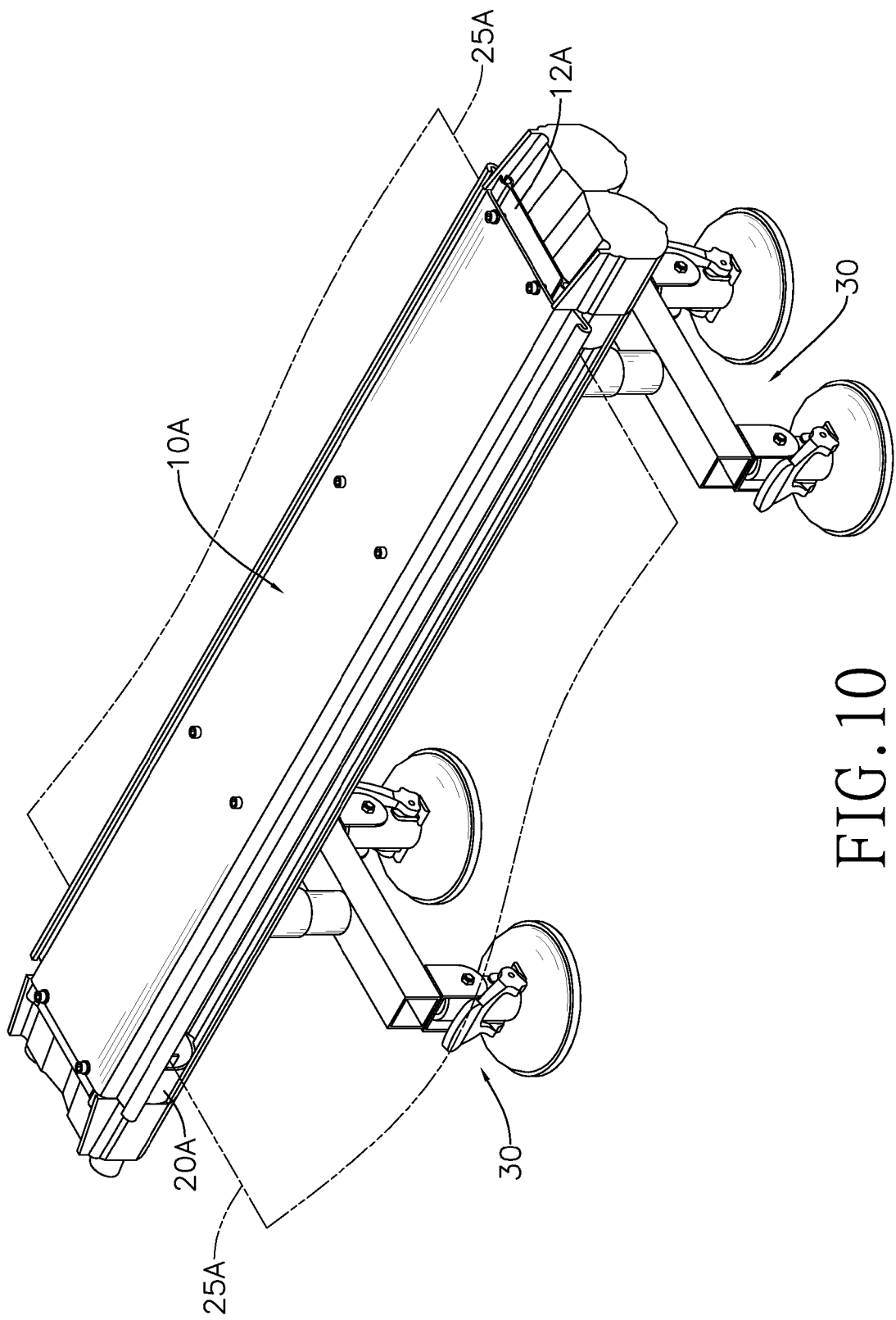
FIG. 10 is a perspective view of a second embodiment of a shielding device in accordance with the present disclosure.

With reference to FIGS. 10 and 11, a second embodiment of a shielding device in accordance with the present disclosure comprises a body 10A and two slewing mechanisms 20A. The body 10A has two unfolding sheets 12A. A width of the unfolding sheet 12A is larger than a width of the unfolding sheet 12 of the first embodiment of the shielding device. Each one of the two slewing mechanisms 20A has a covering cloth 25A, and each covering cloth 25A has two sides and two stretching sections 252A respectively formed on the two sides of the covering cloth 25A. In use, the bodies 10,10A of the two embodiments of the shielding devices are mounted on a top of a vehicle 40 and respectively near the head and the tail of the vehicle 40. Multiple first sucking discs 31 and multiple second sucking discs 60 are attached on the top of the vehicle 40. The restricting belts 18 and multiple second belts 61 are intertwined with wheels and bumper of the vehicle 40 for the stability of the shielding device. With reference to FIGS. 1, 10, and 11, the covering cloth 25 is pulled and the stretching sections 252 are spread to cover the head of the vehicle 40.

Figure 14:
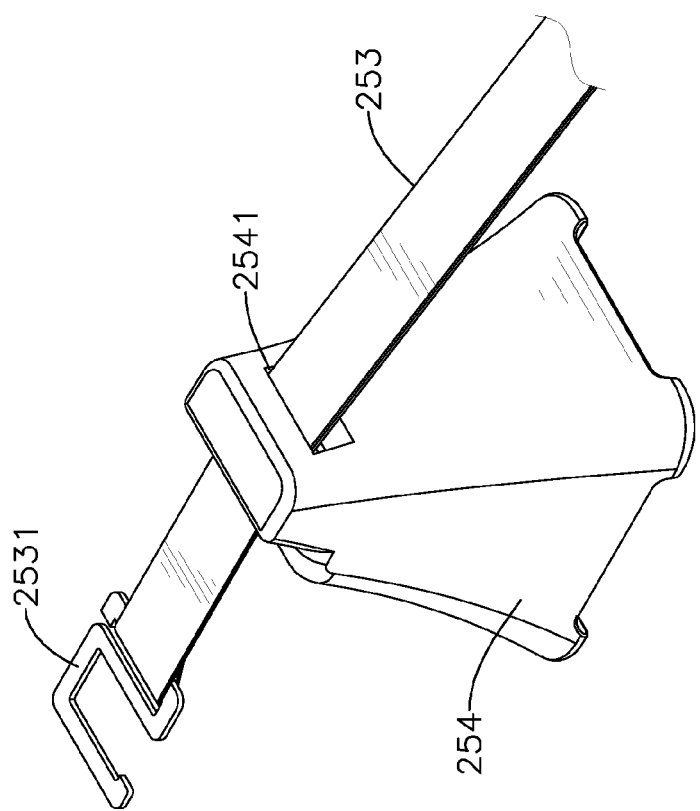
FIG. 14 is a perspective view of the fixing strip combining with a supporting base in FIG. 11.

With reference to FIGS. 12 to 14, the covering cloth 25 further has two supporting bases 254, and each one of the two supporting bases 254 has a supporting hole 2541. The supporting hole 2541 is formed through the supporting base 254. The fixing strip 253 is mounted through the supporting hole 2541 of the supporting base 254. So the hook 2531 of the fixing strip 253 is supported upward by the supporting base 254 to avoid scraping the vehicle 40.

Furthermore, a rack bar 50 is mounted in the covering cloth 25 and has two second sucking discs 60 mounted on a bottom of the rack bar 50. The rack bar 50 is mounted over the head of the vehicle. The fixing strips 253 clasp a chassis of the vehicle 40 for preventing the shielding device from swaying. In addition, the covering clothes 25A of the two slewing mechanisms 20A are respectively spread towards the tail of the vehicle 40 and the body 10. The covering cloth 25A towards the body 10 covers the top of the vehicle 40, and the stretching sections 252A are positioned in both of the unfolding sheets 12 and unfolding sheets 12A. The other covering cloth 25A towards the tail of the vehicle 40 covers the tail of the vehicle 40. Another rack bar 50 is mounted in the covering cloth 25 and has two second sucking discs 60. The rack bar 50 is mounted over the tail of the vehicle. Finally, the vehicle 40 is completely covered by the covering clothes 25, 25A, and the shielding device provides a function of avoiding direct exposure to sunlight, rain, and snow. So the shielding device protects the vehicle 40 from damage.

With reference to FIGS. 3 to 6, when the covering cloth 25 of the slewing mechanism 20 is dragged and spread, the rolling pipe 23, the rotor 22, and the rotating casing 24 are rotated around the spindle 21. The two ends of the torsion spring 223 respectively connect to the fastening portion 222 and the securing ring 224. The pushing rod 15 is pushed outwards by the rotating rotor 22. The end that connects the fastening portion 222 of the torsion spring 223 is rotated at the same time, and the other end that connects the securing ring 224 of the torsion spring 223 is stationary. The torsion spring 223 starts to store the elastic forces when the covering cloth 25 is spreading. The limiting groove 221 of the rotor 22 is fastened and is limited by the limiting portion 152 of the pushing rod 15 to prevent the stored elastic forces of the torsion spring 223 from releasing.

When the user wants to remove the shielding device, first, the two stretching sections 252 are folded relative to the covering cloth 25, and the pulling ring 16 and the pushing rod 15 are dragged outwards. The limiting portion 152 of the pushing rod 15 is moved away from one of the limiting grooves 221, and the elastic forces of the torsion spring 223 is released to drive the rolling pipe 23. The rolling pipe 23 is rotated in an opposite direction to coil the covering cloth 25 into the housing 11 of the body 10. After the above-mentioned operational process, the shielding device is stored in a trunk of the vehicle 40. Further, the shielding device is mounted on the top of the vehicle 40 for use, so the shielding device does not obstruct the traffic and can be stored in the vehicle 40 due to its reduced volume.

Even though numerous characteristics and advantages of the present disclosure have been set forth in the foregoing description, together with details of the structure and features of the disclosure, the disclosure is illustrative only. Changes may be made in the details, especially in matters of shape, size, and arrangement of parts within the principles of the disclosure to the full extent indicated by the broad general meaning of the terms in which the appended claims are expressed.

What is claimed is:
1. A shielding device comprising:
 a body having
  a housing having
   two ends;
   a side wall;
   a bottom surface; and
   a space, the space formed through the two ends and the side wall of the housing;
  a first cover mounted in and extending out of one of the two ends of the housing and partially located in the space of the housing;
  a second cover mounted in and extending out of the other end of the housing and partially located in the space, the second cover having
   an inner side mounted in the housing;
   an outer side extending out of the housing;
   a limiting hole formed through a center of the second cover;
   a positioning hole formed through the second cover near the limiting hole and having an inner wall; and
   a pushing rod slidably mounted through the positioning hole of the second cover;
 at least one slewing mechanism mounted in the body and having a spindle having two ends, and one of the two ends of the spindle mounted in the limiting hole of the second cover;
a rotor mounted on and around the spindle, fastened to and limited by the pushing rod, and having
an inner side;
a fastening portion formed on and protruding from the inner side of the rotor;
a torsion spring having two ends, and one of the two ends of the torsion spring connected to the fastening portion;
a securing ring mounted securely on and around the spindle and distal from the fastening portion, the securing ring connected to the other end of the torsion spring; and
a rotating ring rotatably mounted on and around the spindle and located at an outer side relative to the securing ring;
a rolling pipe having
two ends;
an external wall;
a through hole formed through the two ends of the rolling pipe, and the fastening portion of the rotor fastened in the through hole of the rolling pipe;
a rotating casing connected to the rolling pipe and mounted pivotally in the first cover, the fastening portion of the rotor and the rotating casing respectively closing the two ends of the rolling pipe to enclose the spindle, the torsion spring, the securing ring, and the rotating ring in the rolling pipe; and
a covering cloth connected to the external wall of the rolling pipe; and
two vehicle-top suction attachment assemblies mounted on the bottom surface of the housing of the body and respectively near the first cover and the second cover.

2. The shielding device as claimed in claim 1, wherein the first cover has
an inner surface;
a top surface;
an inner side mounted in the housing;
an outer side extending out of the housing;
a rotating hole centrally caved and formed on the inner surface of the first cover, and the limiting hole being a hexagonal hole and aligning with the rotating hole of the first cover; and
a first slanting groove obliquely formed on the top surface of the first cover and inclined from the inner side of the first cover to the outer side of the first cover; and
the second cover has
a top surface; and
a second slanting groove formed on the top surface of the second cover and gradually inclined from the inner side of the second cover to the outer side of the second cover.

3. The shielding device as claimed in claim 1, wherein the body has a pulling ring;
the second cover has two positioning blocks formed on the inner wall of the positioning hole and being opposite to each other;
the pushing rod has
an outer wall;
a first end;
a second end;
two positioning grooves caved on the outer wall of the pushing rod at the first end of the pushing rod and parallel to each other, the positioning grooves respectively disposed around the positioning blocks of the second cover;
a limiting portion formed on and extending from the second end of the pushing rod and distal from the positioning grooves, and a diameter of the second end of the pushing rod being larger than a diameter of the first end of the pushing rod; and
a compression spring mounted around the outer wall of the pushing rod at the first end of the pushing rod and pushing the positioning blocks, wherein the first end of the pushing rod is mounted through the positioning hole of the second cover and securely connects to the pulling ring.

4. The shielding device as claimed in claim 2, wherein the body has a pulling ring;
the second cover has two positioning blocks formed on the inner wall of the positioning hole and being opposite to each other;
the pushing rod has
an outer wall;
a first end;
a second end;
two positioning grooves caved on the outer wall of the pushing rod at the first end of the pushing rod and parallel to each other, the positioning grooves respectively disposed around the positioning blocks of the second cover;
a limiting portion formed on and extending from the second end of the pushing rod and distal from the positioning grooves, and a diameter of the second end of the pushing rod being larger than a diameter of the first end of the pushing rod; and
a compression spring mounted around the outer wall of the pushing rod at the first end of the pushing rod and pushing the positioning blocks, wherein the first end of the pushing rod is mounted through the positioning hole of the second cover and securely connects to the pulling ring.

5. The shielding device as claimed in claim 3, wherein the housing has
an inner top surface;
a receiving recess formed in the space near the inner top surface of the housing and having two openings; and
an elongated groove caved on the bottom surface of the housing of the body and parallel to the space;
the body has
two unfolding sheets respectively mounted in and extending out of the openings of the receiving recess, and each unfolding sheet having
two long edges;
two fastening grooves formed on the two long edges of the unfolding sheet, and each fastening groove having two holes outwardly formed on the unfolding sheet; and
the covering cloth having two stretching sections being foldable relative to the covering cloth, the two stretching sections respectively positioned in the two fastening grooves of the unfolding sheets.

6. The shielding device as claimed in claim 4, wherein the housing has
an inner top surface;
a receiving recess formed in the space near the inner top surface of the housing and having two openings; and
an elongated groove caved on the bottom surface of the housing of the body and parallel to the space;

the body has
- two unfolding sheets respectively mounted in and extending out of the openings of the receiving recess, and each unfolding sheet having
  - two long edges;
  - two fastening grooves formed on the two long edges of the unfolding sheet, and each fastening groove having two holes outwardly formed on the unfolding sheet; and
- the covering cloth having two stretching sections being foldable relative to the covering cloth, and the two stretching sections respectively positioned in the two fastening grooves of the unfolding sheets.

7. The shielding device as claimed in claim 3, wherein the rotor has
- an outer wall; and
- multiple limiting grooves caved around the outer wall of the rotor, spaced apart from each other, and facing the second cover, and the limiting portion of the pushing rod fastened in one of the limiting grooves.

8. The shielding device as claimed in claim 5, wherein the rotor has
- an outer wall; and
- multiple limiting grooves caved around the outer wall of the rotor, spaced apart from each other, and facing the second cover, and the limiting portion of the pushing rod fastened in one of the limiting grooves.

9. The shielding device as claimed in claim 2, wherein the rolling pipe has at least one connecting groove caved on the external wall of the rolling pipe;
the rotating casing has
- an internal wall;
- an external wall;
- a fixing portion extending on the internal wall of the rotating casing and being a hollow structure, the securing ring of the rotor mounted around the other end of the spindle, the securing ring and the rotating ring mounted in the fixing portion, and the fixing portion fastened in the through hole of the rolling pipe and opposite to the fastening portion of the rotor; and
- a pivoting portion extending on the external wall of the rotating casing and mounted pivotally in the rotating hole of the first cover.

10. The shielding device as claimed in claim 1, wherein the shielding device comprises
- two slewing mechanisms, each one of the two slewing mechanisms having
  - a covering cloth having
    - two sides; and
    - two stretching sections formed on the two sides of the covering cloth.

11. The shielding device as claimed in claim 10, wherein the covering cloth has
- a front edge; and
- two fixing strips connected to the front edge of the covering cloth between the stretching sections, each fixing strip having
  - a hook having two hook parts, and the covering cloth and the fixing strips connected to each other by the hook parts of the hooks.

12. The shielding device as claimed in claim 9, wherein the shielding device further has
- a rack bar mounted in the covering cloth; and
- two second sucking discs mounted on a bottom of the rack bar.

13. The shielding device as claimed in claim 5, wherein the body has
- two belt-hooking sheets, the belt-hooking sheets mounted securely in the elongated groove of the housing and disposed below the first cover and the second cover; and
- two restricting belts respectively connected to the belt-hooking sheets.

14. The shielding device as claimed in claim 9, wherein the rolling pipe has two connecting grooves caved on the external wall of the rolling pipe and parallel to each other.

15. The shielding device as claimed in claim 1, wherein each vehicle-top suction attachment assembly has
- a bottom surface; and
- two first sucking discs mounted on the bottom surface of the vehicle-top suction attachment assembly, the two first sucking discs spaced apart at an interval.

16. The shielding device as claimed in claim 10, wherein the covering cloth further has two supporting bases, each one of the two supporting bases has a supporting hole, and the fixing strip is mounted through the supporting hole of the supporting base.

* * * * *